United States Patent [19]
Bocklisch et al.

[11] Patent Number: 5,668,625
[45] Date of Patent: Sep. 16, 1997

[54] APPARATUS FOR AND METHOD FOR HANDLING FILM IN A PHOTOGRAPHIC PRINTER

[75] Inventors: Siegfried Bocklisch, Rüdersdorf; Wolfgang Fielder, Gera; Helmut Treiber, München; Rainer Leuschner, Gera; Wilfried Reichel, Münchenbernsdorf; Michael Wilde, Gera, all of Germany

[73] Assignee: Agfa-Gevaert Aktiengesellschaft, Leverkusen, Germany

[21] Appl. No.: 508,619

[22] Filed: Jul. 28, 1995

[30] Foreign Application Priority Data

Jul. 29, 1994 [DE] Germany ............... 44 27 003.8

[51] Int. Cl.$^6$ ............ G03B 27/52; G03B 27/58; G03B 27/60; G03B 27/64
[52] U.S. Cl. ............ 355/73; 355/30; 355/72; 355/74
[58] Field of Search ............ 355/30, 76, 75, 355/91, 724, 73, 744; G03B 27/58, 27/60, 27/52

[56] References Cited

U.S. PATENT DOCUMENTS

| | | | |
|---|---|---|---|
| 2,443,171 | 6/1948 | Tuttle | 355/76 |
| 4,378,155 | 3/1983 | Nygaard | 355/76 X |
| 4,619,526 | 10/1986 | Hougaard | 355/76 X |
| 5,404,195 | 4/1995 | Nagel | 355/76 |

FOREIGN PATENT DOCUMENTS

| | | |
|---|---|---|
| 2220151 | 7/1973 | Germany . |
| 2331275 | 1/1974 | Germany . |
| 2932878 | 2/1980 | Germany . |
| 3106145 | 7/1984 | Germany . |
| 4130564 | 6/1993 | Germany . |
| 4257846 | 9/1992 | Japan . |

Primary Examiner—Arthur T. Grimley
Assistant Examiner—Herbert Kerner
Attorney, Agent, or Firm—Furgang & Milde, LLP

[57] ABSTRACT

An apparatus and method for handling photographic film within the print-exposure section of a photographic printer. A mask matches the film frame (negative) and has a window for the passage of the exposure light. The mask also has holes through which air can be directed onto the film. A guide for the edges of the film parallels, and demarcates a gap with the mask. A source of air under either overpressure or underpressure supplies such air to the mask (4) and the film (1) through the air-direction openings (15). The air is supplied with overpressure while the film is being advanced. The air is supplied with underpressure while the print is being exposed to clamp the film.

12 Claims, 3 Drawing Sheets

APPARATUS FOR AND METHOD FOR HANDLING FILM IN A PHOTOGRAPHIC PRINTER

BACKGROUND OF THE INVENTION

The present invention relates to apparatus and a method for handling photographic film within the print-exposure section of a photographic printer.

Photographic printers have a component called a "negative supporting stage". Its purpose is to handle the advancing film in such a way as to prevent scratches or other damage and to keep the film correctly positioned while the print is being exposed. The film must also be kept flat during the exposure. Areas that were not flat would project a blurred image onto the paper. Although the film is handled only at the edges while it advances, it must be secured at all four sides of each individual frame or negative on the film strip to keep it flat enough during print exposure. The film accordingly travels between two flat negative-film masks provided with apertures that match the negatives and that constitute a window for passage of the printing light during exposure of the film. The masks are clamped together with the photographic film between them while the print film and print are being exposed, and are then separated once the requisite frame area has been exposed to keep them away from the film as it advances again.

Due to the mechanism for separating the masks, a lot of space must be reserved in a printer for the negative supporting stage. The published German patent application No. OS 4,130,564 accordingly discloses a device with one moving mask and one stationary mask. The edges of the aperture of the stationary mask that extend across the direction the film advances along are provided with openings. Air is forced through these openings while the film is advancing, keeping it off the mask.

The published German patent application No. OS 2,932,878 discloses a device wherein air is forced against the film while the print is being exposed, instead of while the film is being advanced. The air is injected between the film and a transparent plate. The air forces the negative against a transparent lower plate and accordingly eliminates the need for a mechanical clamping mechanism.

SUMMARY OF THE INVENTION

A principal object of the present invention is to provide an improved apparatus and method for handling photographic film, within the print-exposure section or "negative supporting stage" of a photographic printer, which causes the negatives to be kept flat while the print is being exposed. A further object of the present invention is to provide such an apparatus and method which eliminates the need for a mechanically moved negative-film mask so that the film will not be scratched as it advances.

These objects, as well as other objects which will become apparent from the discussion that follows, are achieved, in accordance with the present invention, by supplying air at an overpressure between the photographic film and the mask while the film is being advanced and supplying air at an underpressure between the film and the mask while the print is being exposed.

Blowing on the film while it advances lifts it off the mask so that it can be advanced without contact with the mask. The film is kept flat during exposure by creating a vacuum in the air-conveyance channels. The alternation between overpressure and underpressure permits the realization of a negative supporting stage with the various advantages of a conventional stage having two moving negative masks while scratches are prevented and while the negative is kept flat enough to ensure adequate resolution. The negative supporting stage in accordance with the present invention has no mechanically moving parts and is accordingly essentially more cost effective to manufacture and less sensitive to malfunction.

The alternation between overpressure and underpressure is advantageously attained with pneumatic valves. Such valves are standard components and accordingly inexpensive to obtain.

One advantageous embodiment of the present invention employs two three-way valves incorporated into flexible tubing. Such valves allow the pressure end and the vacuum end to communicate alternately with the air-conveyance channels. Either end can be connected to either the air-conveyance openings or to the atmosphere.

Since negatives can get very hot while the print is being exposed, especially when several exposures are carried out with the same negative, it has turned out to be practical to provide a blower that directs cool air over the negative during the exposure. The blower can communicate with the pressure end of the three-way valve so that air will enter the blower instead of escaping into the atmosphere during exposure.

If the printing device does not already include pneumatic components, a small pump can be employed as a source of overpressure and underpressure, and the tubing can be attached to its vacuum and pressure ends. On the other hand, since many printers now on the market already include a source of compressed air for controlling their pneumatic components, a simple Venturi tube can be employed to generate both overpressure and underpressure. Alternatively, the Venturi tube can be reserved for generating vacuum and the existing source of compressed air may be used to supply the overpressure. In this event only one three-way valve is needed to alternate between overpressure and underpressure.

To precisely guide the edges of the film while it is being advanced through the print-exposure section, and also while the print is being exposed, lateral limit stops can be provided in the gap between the mask and the film-edge guide. These delimiters can either occupy the whole gap or be attached to the film guide, leaving a smaller gap facing the mask. Lateral limit stops have been demonstrated to be particularly practical when prints are printed from separate photographic films because they ensure proper guidance of the film's lead. No limit stops are necessary in the vicinity of the mask when roll film is being handled because the roll is already kept straight upstream and downstream of the mask.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
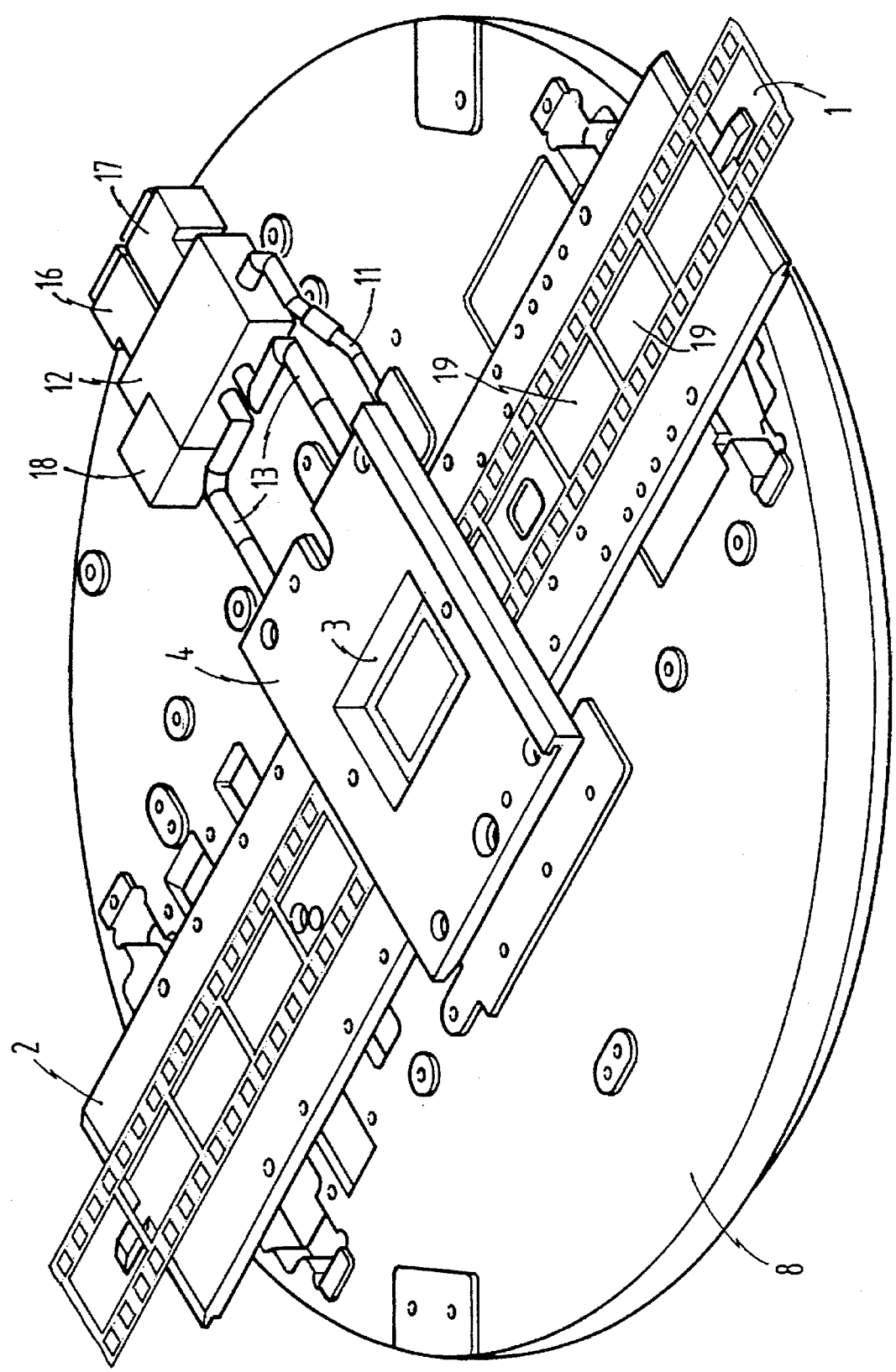
FIG. 1 is a perspective representation of a negative supporting stage in a print-exposure section of a photographic printer.
Figure 2:
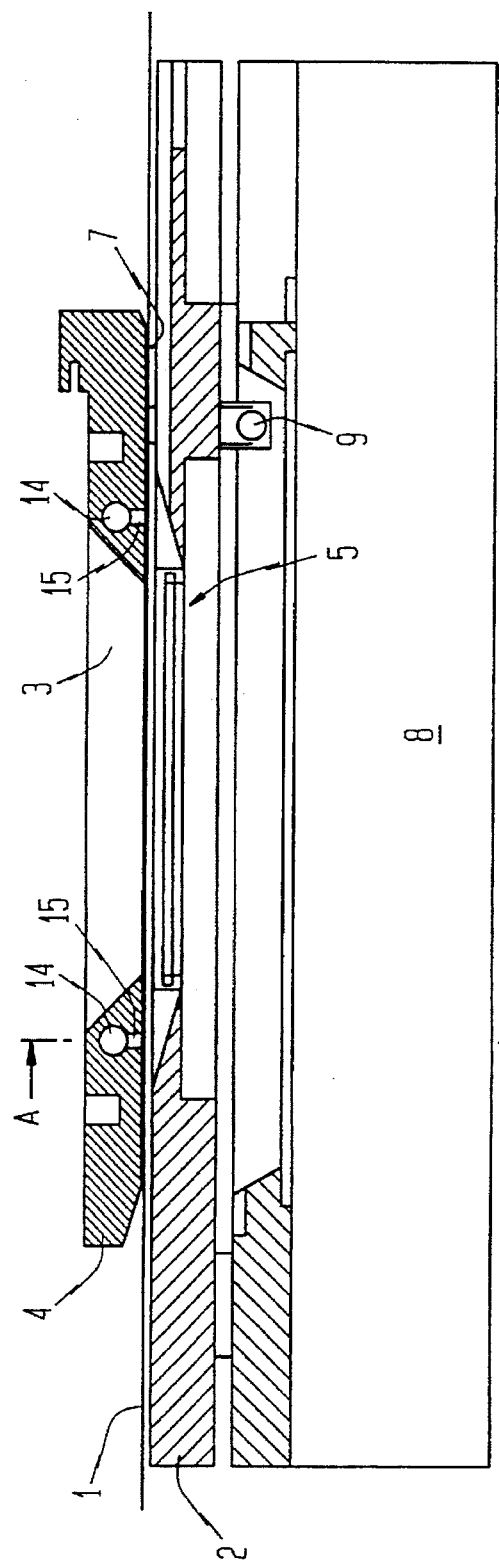
FIG. 2 is a longitudinal section through the negative supporting stage of FIG. 1.
Figure 3:
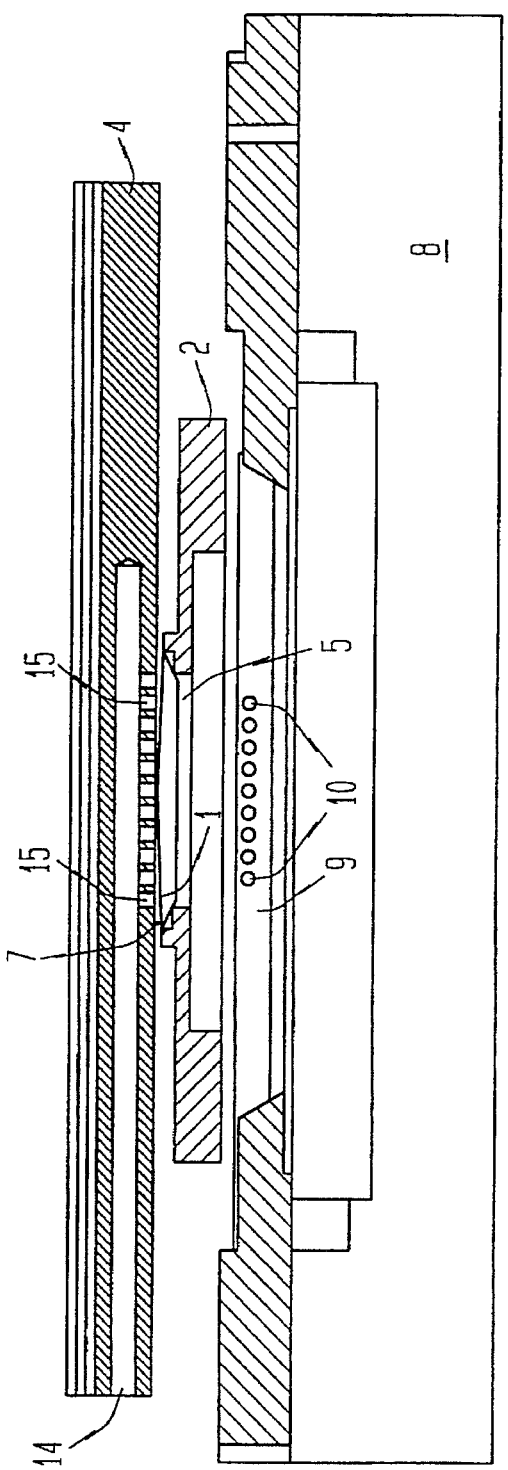
FIG. 3 is a transverse section through the negative supporting stage along the line A—A in FIG. 2.

The preferred embodiments of the present invention will now be described with reference to FIGS. 1–5 of the drawings. Identical elements in the various figures are designated with the same reference numerals.

Film 1 is advanced through the print-exposure section on a film-edge guide 2. A film-edge guide 2 has a cutout 5 in the vicinity of a light exposure window 3 in a film-negative mask 4. A gap 7 is left between the guide 2 and mask 4. The film-edge guide 2 is secured to a carrier 8 which supports a blowing tube 9. Tube 9 is provided with out-blowing openings 10. Tube 9 communicates with a valve 12 through flexible tubing 11. Valve 12 communicates with air-conveyance channels 14 in the mask 4 through flexible tubing 13. Channels 14 extend transverse to the direction the film advances and have air-direction openings 15 in the vicinity of the window 3. The valve 12 also has three connections 16, 17, and 18. Connection 16 communicates with the suction-generating line of a Venturi tube, connection 17 with the tube's air-supply line, and connection 18 with tubing that conveys air to the valve 12.

Figure 4:
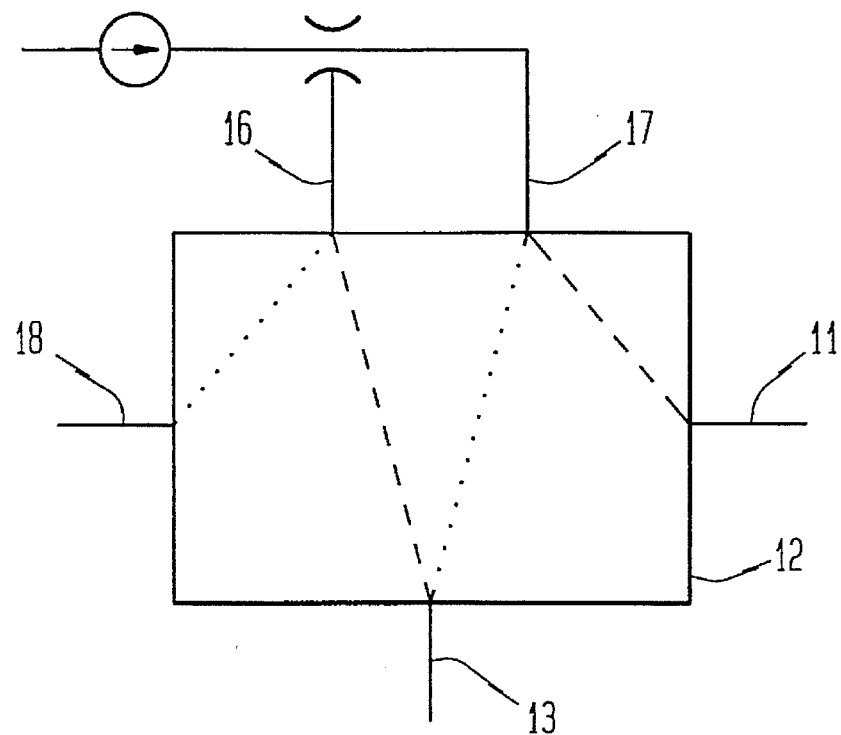
FIG. 4 is a diagram of a pneumatic system for a photographic printer with two three-way valves.

Once a print has been exposed and film i is to be advanced one frame 19 farther, an unillustrated computer actuates the valve 12, which establishes the communication between the connection 17 and tubing 13 and between the connection 16 and connection 18 represented by the dotted lines in FIG. 4. The Venturi tube will now supply air to the tubing 13 through the connection 17 and remove it through connections 16 and 18. Tubing attached to the connection 18 can either obtain air from the atmosphere or, if attached to a film-cleaning component upstream of the printer, vacuum dust from the film.

The air is supplied to the air-conveyance channels 14 in mask 4 through tubing 13 and leaves through air-direction openings 15. The air accordingly supplied to between film 1 and mask 4 forces the film down, eliminating all contact between it and the mask. The film now advances until the next frame 19 is precisely positioned in window 3. The computer now actuates the valve 12, which establishes the communications between connection 16 and tubing 13 and between connection 17 and the tubing 11 represented by the broken lines in FIG. 4. The air between film 1 and mask 4 is accordingly drawn out through the tubing 13, air-conveyance channels 14 and air-direction openings 15. The resulting vacuum forces the film against the mask and secures it there. The film is accordingly maintained flat while the print is being exposed with no need for the mask 4 or guide 2 to move in order to secure the film. The absence of mechanical pressure also decreases the risk of scratching the film.

The pressure in the tubing 11 is employed to advantage to blow air carefully over the film and accordingly cool it while the print is be exposed. The distance between tube 9 and film 1 must be specified in relation to the size of out-blowing openings 10 to prevent the air below the film from curving (bowing) the film outward through the window 3. The film will also accordingly withstand several exposures through one negative, as necessary for the production of what are called "package prints". Once the print has, or prints have been exposed, the valve will be returned to its original state and the film can be advanced farther.

Figure 5:
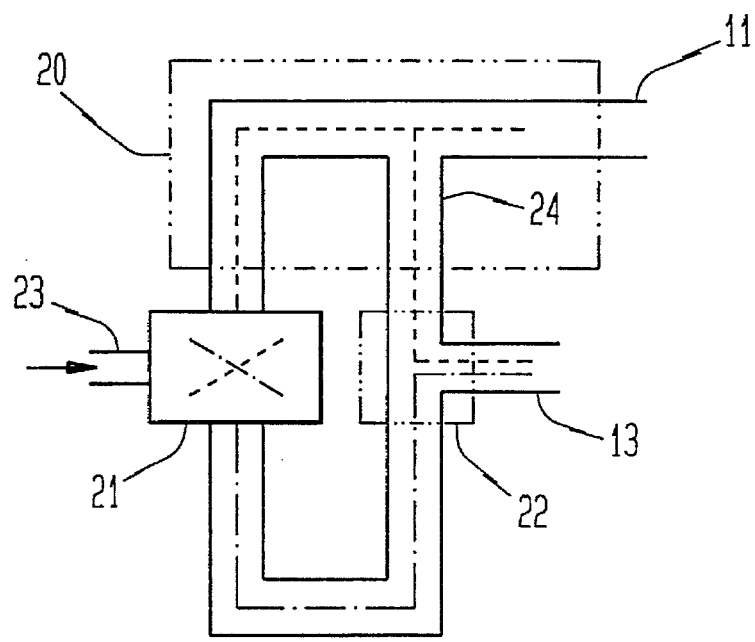
FIG. 5 illustrates a pneumatic switch with a Venturi tube and a three-way valve for a photographic printer.

FIG. 5 illustrates a complete assembly that can detect all the necessary fluidic states and comprises only a Venturi tube 20, a three-way valve 21, and a T connection 22. Valve 21 communicates with the printer's primary source of compressed air through a line 23. When the valve is in the state represented by the dashed lines, the air will travel along those lines to the tubing 11 through the Venturi tube 20. A vacuum is accordingly established at the suction end 24 of the tube through the T connection 22 and tubing 13 as far as the mask. The assembly is then in the exposure state.

Once the valve 21 has changed into the state represented by the dot-and-dash lines, the air will travel along that route to the mask by way of the T connection 22 and tubing 13. When the assembly is in this state, the film can be advanced again without damage.

There has thus been shown and described a novel device for and method of handling photographic film which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In apparatus for handling photographic film within a print-exposure section of a photographic printer, said film having at least one film frame, said apparatus comprising (1) a film frame mask having a window for the frame with openings to be exposed to light and having at least one air duct with air openings adjacent the film and (2) a guide for the edges of the film that parallels the mask and demarcates a gap therewith for the passage of the film, the improvement comprising (a) air source means for producing an overpressure and an underpressure source of air, and (b) air control means, connected to said air source means and to said air duct, for supplying air at said overpressure or underpressure between the mask and the film through said air openings, the overpressure while the film is being advanced through the gap and the underpressure while the film frame is being exposed, and wherein the width of said gap remains constant while the film is being advanced and while the film is being exposed.

2. The apparatus defined in claim 1, wherein the air control means include an air valve connecting said air source means with said air duct.

3. The apparatus defined in claim 2, wherein said air valve alternately connects said air duct to the overpressure and underpressure source of said air source means.

4. The apparatus defined in claim 1, comprising a plurality of said air ducts in said mask.

5. The apparatus defined in claim 4, further comprising a three way valve and flexible tubing connecting the blower and the air duct with the three-way valve.

6. The apparatus defined in claim 1, further comprising blower means for providing said film frame with cooling air while a frame is being exposed.

7. The apparatus defined in claim 1, wherein the air source means includes a pump.

8. The apparatus defined in claim 1, wherein the air source means includes a Venturi tube.

9. The apparatus defined in claim 1, wherein the air source means and the air control means include an assembly comprising a three-way valve, a Venturi tube connected to the valve, and a T connection connected to the Venturi tube and the valve.

10. The apparatus defined in claim 1, wherein the width of said gap remains constant while the film is being advanced and while the film is being exposed.

11. In a method of handling photographic film within the print-exposure section of a photographic printer, said film having at least one film frame, said printer comprising (1) a mask having a window for the frame to be exposed to light and (2) a guide for the edges of the film that parallels the mask and demarcates a gap therewith for passage of the film, the improvement comprising the steps of (a) supplying air at an overpressure between the film and the mask while the film is being advanced and (b) supplying air at an underpressure between the film and the mask while the frame is being exposed.

12. The method defined in claim 11, further comprising the steps of blowing cool air over the film while the frame is being exposed.

* * * * *